US011920387B2

(12) United States Patent
Velicanin et al.

(10) Patent No.: US 11,920,387 B2
(45) Date of Patent: Mar. 5, 2024

(54) MOTOR VEHICLE HANDLE ARRANGEMENT AND METHOD FOR OPERATING SUCH A MOTOR VEHICLE HANDLE ARRANGEMENT

(71) Applicant: HUF HÜLSBECK & FÜRST GMBH & CO. KG, Velbert (DE)

(72) Inventors: Mensur Velicanin, Velbert (DE); Aytac Aslan, Velbert (DE); Michael Theidel, Muelheim (DE)

(73) Assignee: HUF HUELSBECK & FUERST GMBH & CO. KG, Velbert (DE)

( * ) Notice: Subject to any disclaimer, the term of this patent is extended or adjusted under 35 U.S.C. 154(b) by 854 days.

(21) Appl. No.: 16/962,663

(22) PCT Filed: Nov. 8, 2018

(86) PCT No.: PCT/EP2018/080669
§ 371 (c)(1),
(2) Date: Jul. 16, 2020

(87) PCT Pub. No.: WO2019/141396
PCT Pub. Date: Jul. 25, 2019

(65) Prior Publication Data

US 2020/0347651 A1 Nov. 5, 2020

(30) Foreign Application Priority Data

Jan. 18, 2018 (DE) ..................... 10 2018 101 040.0

(51) Int. Cl.
*E05B 85/10* (2014.01)
*E05B 81/06* (2014.01)

(52) U.S. Cl.
CPC ............ *E05B 85/107* (2013.01); *E05B 81/06* (2013.01); *E05B 85/103* (2013.01)

(58) Field of Classification Search
CPC ...... E05B 85/107; E05B 85/103; E05B 81/06; E05B 77/34
(Continued)

(56) References Cited

U.S. PATENT DOCUMENTS 8,701,353 B2 * 4/2014 Patel ..................... E05B 85/103
292/201
10,280,658 B2 * 5/2019 Halliwell .............. E05B 85/107
(Continued)

FOREIGN PATENT DOCUMENTS

DE 19740827 A1 3/1999
DE 10 2013 212198 A1 1/2014
(Continued)

OTHER PUBLICATIONS

International Search Report of International Application No. PCT/EP2018/080669 dated Feb. 19, 2019, 4 pages.
(Continued)

*Primary Examiner* — William L Miller
(74) *Attorney, Agent, or Firm* — Lippes Mathias LLP

(57) ABSTRACT

A motor vehicle handle arrangement includes an actuating element, which is movable between a neutral position and an active position, a handle part, which is movable between a non-use position and an actuating position, and a mechanical restoring element. In a normal operation, the actuating element is designed to move the handle part from the non-use position into the actuating position. In the active position, it holds the handle part in the actuating position. An auxiliary restoring element is movably mounted and coupled in movement with the actuating element in such a way that, during a faulty operation in which the actuating element moves into the neutral position and the handle part is arranged remaining in its actuating position, it is designed,
(Continued)

at least for a fraction of its movement, to move the handle part concomitantly in the direction of its non-use position.

9 Claims, 5 Drawing Sheets

(58) Field of Classification Search
USPC .......................................... 16/412; 292/336.3
See application file for complete search history.

(56) References Cited

U.S. PATENT DOCUMENTS

| | | | | |
|---|---|---|---|---|
| 11,214,994 | B2 * | 1/2022 | Han | E05B 79/06 |
| 11,441,340 | B2 * | 9/2022 | Rhein | E05B 81/42 |
| 11,492,822 | B2 * | 11/2022 | Schnetter | E05B 81/00 |
| 2013/0127185 | A1 * | 5/2013 | Lang | E05B 81/77 292/336.3 |
| 2013/0241215 | A1 * | 9/2013 | Halliwell | E05B 85/107 292/336.3 |
| 2014/0132012 | A1 * | 5/2014 | Yoshino | E05B 85/103 292/336.3 |
| 2017/0260780 | A1 * | 9/2017 | Christensen | E05B 85/103 |
| 2019/0257124 | A1 * | 8/2019 | Löw | E05B 85/103 |
| 2020/0354996 | A1 * | 11/2020 | Bresser | E05B 85/103 |
| 2021/0172218 | A1 * | 6/2021 | Velicanin | E05B 85/107 |
| 2021/0363793 | A1 * | 11/2021 | Rhein | E05B 81/90 |
| 2022/0042356 | A1 * | 2/2022 | Herdering | E05B 81/77 |
| 2022/0195762 | A1 * | 6/2022 | Toyama | E05B 85/103 |
| 2022/0282533 | A1 * | 9/2022 | Schütz | E05B 81/06 |

FOREIGN PATENT DOCUMENTS

| | | | | |
|---|---|---|---|---|
| DE | 102015121272 | A1 * | 6/2017 | |
| DE | 102018133310 | A1 * | 6/2020 | |
| DE | 102019100319 | A1 * | 7/2020 | B60J 5/0468 |
| EP | 2 730 730 | A2 | 5/2014 | |

OTHER PUBLICATIONS

International Preliminary Report on Patentability of International Application No. PCT/EP2018/080669 dated Jul. 21, 2020 (with English Translation), 16 pages.

* cited by examiner

MOTOR VEHICLE HANDLE ARRANGEMENT AND METHOD FOR OPERATING SUCH A MOTOR VEHICLE HANDLE ARRANGEMENT

BACKGROUND

The invention relates to a motor vehicle handle arrangement having a support element which can be fastened to a vehicle door, a motor-driven actuating element which is movably mounted on the support element between a neutral position and an active position, a handle part, which is movably mounted on the support element between a non-use position and an actuating position serving for actuation by a user, and a mechanical restoring element, wherein the motor-driven actuating element is designed to move the handle part from the non-use position into the actuating position during its movement from the neutral position into the active position in the normal operation of the motor vehicle handle arrangement and to hold the handle part in the actuating position when arranged in the active position, and wherein the mechanical restoring element in the normal operation of the motor vehicle handle arrangement presses the handle part back from its actuating position into its non-use position when the motor-driven actuating element moves back into its neutral position. The present invention also relates to a method for operating such a motor vehicle handle arrangement, wherein in normal operation of the motor vehicle handle arrangement the motor-driven actuating element is moved from the neutral position into the active position and the handle part is moved by the motor-driven actuating element from the non-use position into the actuating position, wherein the handle part is held in the actuating position by the actuating element arranged in its active position, and wherein in normal operation the handle part is pushed back by the mechanical restoring element from its actuating position into its non-use position when the motor-driven actuating element moves back into its neutral position.

Such motor vehicle handle arrangements can be designed as an inner or outer handle part, wherein the present invention relates to a motor vehicle handle arrangement for an outer handle part. For this type of motor vehicle handle arrangement, there is a variety of different constructions and embodiments. The embodiment of a motor vehicle handle arrangement according to the invention relates to such constructions in which a support element is secured to the rear of the vehicle door, i.e. inside the motor vehicle. The handle part attached to the support element usually protrudes from the vehicle door in such embodiments and disturbs both the aesthetic impression of the motor vehicle and the vehicle aerodynamics. In order to avoid these disadvantages, motor vehicle handle arrangements are known from the prior art, in which the outside of the handle part, in its non-use position, in which it is not used by a user, runs approximately flush with the outer contour of the vehicle door, i.e. area-flush, or is retracted and is arranged such that it is unsuitable for handling. Such a handle part can be converted into an actuating position for opening the vehicle door, in which the handle part protrudes relative to the outer contour of the vehicle door and can be gripped from behind and handled by the user.

A motor vehicle handle arrangement of the type described at the outset is known, for example, for electric cars from Tesla Motors Inc. and from DE 10 2013 212 198 A1. This known motor vehicle handle arrangement has a handle part which is arranged flush in its non-use position and which can be moved in a motor-driven manner from the non-use position into an actuating position. Such a handle part is preferably used in electric cars in which the handle part is only extended by means of a motor-driven actuating element from its non-use position, in which the handle part is arranged to reduce the air resistance, into the actuating position, when a legitimate user approaches the motor vehicle. Once the handle part is no longer needed, it returns to the non-use position and disappears into the vehicle body to avoid producing air resistance. However, situations may also arise or may be desired in which the handle part is arranged in its actuating position when it is extended over a longer period of time. There is a risk that the handle part freezes in the actuating position. In this case, the force of a mechanical restoring element, which in normal operation pushes the handle part back from the actuating position into the non-use position, may not be sufficient to move the handle part back into the non-use position, such that the handle part remains in the actuating position, although the motor-driven actuating element, which moves the handle part from the non-use position into the actuating position when moving from a neutral position into an active position, has already returned to its neutral position. Such a situation can occur, for example, during temporary storage, transportation, or shipping of new motor vehicles in which the motor vehicles have been parked for a longer period of time and the battery is therefore disconnected. In order to nevertheless get into the motor vehicle, the handle parts remain in the actuating position in such situations, which results in the risk of the handle part freezing as described above. If the handle part is arranged frozen in its actuating position, the handle part no longer retracts after a long standstill when the motor vehicle is to be moved again.

The invention has for its object to provide a solution that provides an improved motor vehicle handle arrangement in a structurally simple manner, in which it is ensured that a handle part frozen in its actuating position is also moved back into its non-use position when the motor-driven actuating element moves into its neutral position and the arrangement of the handle part in the non-use position is desired.

BRIEF SUMMARY

In a motor vehicle handle arrangement of the type described in the introduction, the object is achieved according to the invention in that an auxiliary restoring element is movably mounted on the support element and is motion-coupled to the motor-driven actuating element, wherein the auxiliary restoring element is designed to move the handle part in the direction of its non-use position at least for a portion of its movement during a faulty operation in which the motor-driven actuating element moves into the neutral position and the handle part remains in its actuating position.

Likewise, in a method for operating a motor vehicle handle arrangement, the object is achieved in that an auxiliary restoring element moves the handle part at least for a portion of its movement in the direction of its non-use position during a faulty operation of the motor vehicle handle arrangement in which the motor-driven actuating element is moved into the neutral position and the handle part remains in its actuating position.

Advantageous and expedient refinements and developments of the invention result from the respective subclaims.

The invention provides a motor vehicle handle arrangement and a corresponding operating method, the motor vehicle handle arrangement being distinguished by a simple construction and, at the same time, safe operating behavior during a restoring process for the handle part. The fact that the auxiliary restoring element is motion-coupled to the motor-driven actuating element and, during the faulty operation, is designed to move the handle part at least for a portion of its movement in the direction of its non-use position ensures that, for example, a jerky breakaway is realized when the handle part is frozen in its actuating position which then makes it possible for the mechanical restoring element to push the handle part back into the non-use position as desired. The auxiliary restoring element consequently does not move the handle part from the actuating position to the non-use position. Rather, the auxiliary restoring element ensures that the handle part experiences a jerk in the direction of its non-use position, as a result of which the handle part is broken loose in an icing condition. For the purposes of the invention, the expression "motion-coupled" is to be understood as meaning such a coupling between the motor-driven actuating element and the auxiliary restoring element that either the motor-driven actuating element is mechanically coupled to the auxiliary restoring element, so that when the motor-driven actuating element moves, the auxiliary restoring element also moves at the same time, or a detection device detects that the motor-driven actuating element is arranged in its neutral position and the handle part is still arranged in its actuating position, so that after this detection the auxiliary restoring element moves in such a way that the handle part is jerked or moved in the direction of its non-use position. The auxiliary restoring element can, for example, be hook-shaped and can be moved either rotationally or linearly with respect to the support element in such a way that it only acts on the handle part or on a bearing element supporting the handle part, such as a lever, for example, until the handle part starts moving into the actuating position. In other words, the auxiliary restoring element only acts on the handle part or on a bearing element supporting the handle part until the handle part moves from its actuating position in the direction of the non-use position.

In an advantageous embodiment, the invention provides that the handle part, when installed in the vehicle door, is arranged flush with the outside of the vehicle door in the non-use position and is arranged extended in relation to the outside of the vehicle door for actuation by a user in the actuating position. A flush or area-flush arrangement of the handle part in its non-use position is not absolutely necessary for the invention, because designs and arrangements of the handle part are also conceivable in which the handle part is not flush, but can still be retracted and not be accessible for handling.

To minimize the installation space of the motor vehicle handle arrangement according to the invention, the invention provides in a further embodiment that at least one lever element is rotatably mounted about an axis of rotation on the support element, by means of which the handle part is movably mounted on the support element. The lever element consequently ensures that the handle part takes up little space between the non-use position and the actuating position.

In an embodiment of the invention, it is structurally particularly favorable if the mechanical restoring element is designed as a spring element having a first spring leg and a second spring leg, wherein the first spring leg is supported on a support projection formed on the support element and the second spring leg is supported on a restoring arm of the lever element. When the handle part moves from the non-use position into the actuating position, the spring element is compressed and thereby generates a restoring force which acts on the handle part in the direction of its non-use position.

In a further embodiment, the invention provides that the lever element has an actuating arm which, in normal operation, bears against a movement contour formed on the motor-driven actuating element. Consequently, there is an interaction between the restoring element and the movement contour since the restoring element can only push the lever element back as far as the actuating arm rests on the movement contour. The movement contour is therefore decisive for the manner and speed with which the handle part is extended and retracted.

In order to ensure that the handle part is moved back from its actuating position into the non-use position even when iced up, the invention provides in a further embodiment that a driver projection is formed on the restoring arm and the auxiliary restoring element has a driver web which, during a faulty operation, when the motor-driven actuating element moves from the active position into the neutral position, is designed to intermittently engage with the driver projection, and to rotate the lever element in a restoring direction of rotation about the axis of rotation.

A particularly effective possibility of using a common drive element is provided in a further embodiment of the invention in that the motor-driven actuating element is mounted on the support element via a motor drive axis, wherein the movement of the motor-driven actuating element from the active position into the neutral position in the auxiliary operation is a rotary movement about the motor drive axis in a direction of rotation opposite to the restoring direction of rotation.

Furthermore, in view of a simple construction with a small installation space in an embodiment of the invention, it is advantageous if the motor-driven actuating element is designed as an eccentric disc, the edge of which forms the movement contour, wherein the edge has an increasing radius with respect to the motor drive axis along which radius the actuating arm of the lever element slides when the motor-driven actuating element moves from the neutral position into the active position.

In a further embodiment, the invention provides that the driver web of the auxiliary restoring element is formed on a side surface of the eccentric disc. The actuating element in the form of the eccentric disc thus simultaneously provides the auxiliary restoring element, wherein the movement of the actuating element is also used for the auxiliary restoring element.

Finally, in an embodiment of the motor vehicle handle arrangement it is provided that the at least one lever element, which is rotatably mounted on the support element, is rotatably connected to a base plate to which the handle part is attached. With this configuration, the number of components required to move the handle part out of the non-use position into the actuating position can be kept low. The handle part is mounted on the base plate in accordance with the configuration, which advantageously increases the stability of the handle part.

It goes without saying that the features mentioned above and those to be explained below can be used not only in the combination indicated but also in other combinations or alone, without leaving the scope of this invention. The scope of the invention is defined only by the claims.

BRIEF DESCRIPTION OF THE DRAWINGS

Other details, features, and advantages of the subject matter of the invention can be found in the following description in connection with the drawing in which an exemplary and preferred embodiment of the invention is shown.

In the drawing.

DETAILED DESCRIPTION

Figure 1:
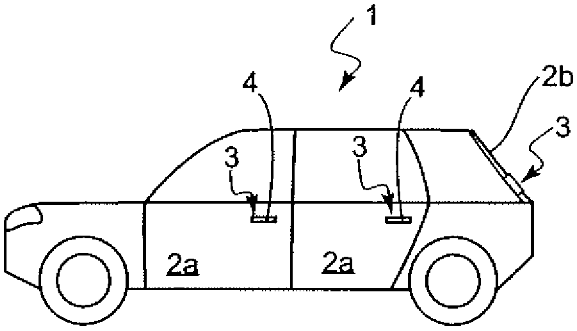
FIG. 1 shows a schematic side view of a motor vehicle having a plurality of motor vehicle handle arrangements according to the invention.

FIG. 1 shows a motor vehicle 1 in the form of a car by way of example, which in the example has four vehicle doors 2*a* (two of which can be seen in FIG. 1) and a vehicle tailgate 2*b* which has a respective motor vehicle handle arrangement 3 and which can be opened in particular with the aid of a handle part 4 of the motor vehicle handle arrangement 3. The motor vehicle handle arrangement 3 according to the invention is consequently not only suitable for vehicle doors 2*a*. Rather, it can also be used on vehicle tailgates 2*b*, such as a hatchback or a trunk lid.

Figure 2:
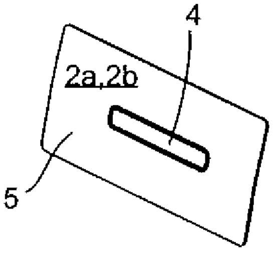
FIG. 2 shows a perspective view of a motor vehicle handle arrangement according to the invention having a handle part arranged flush or area-flush with the outside of a vehicle door in a non-use position.
Figure 3:
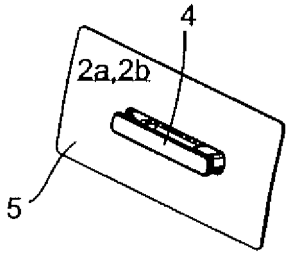
FIG. 3 shows a perspective view of the motor vehicle handle arrangement according to the invention with a handle part arranged in an actuating position.

FIG. 2 shows a perspective view of one of the vehicle doors 2*a* or the vehicle tailgate 2*b* and the handle part 4 used to open the vehicle door 2*a* or vehicle tailgate 2*b*. In FIG. 2—when the motor vehicle handle arrangement 3 is installed in the vehicle door 2*a* or in the vehicle tailgate 2*b*—the handle part 4 is arranged approximately flush with the outside 5 of the vehicle door 2*a* or vehicle tailgate 2*b*, i.e. flush or area-flush with the surface. In this position the handle part 4 is in a non-use position in which it is not used. The handle part 4 can be transferred from the non-use position shown in FIG. 2 into an actuating position shown in FIG. 3, in which it protrudes from the outside 5 of the vehicle door 2*a* or vehicle tailgate 2*b*. Accordingly, the handle part 4 is arranged in its actuating position protruding from the vehicle door 2*a* or vehicle tailgate 2*b*. In this actuating position protruding or extended from the outside 5, an operator can reach behind and actuate or manipulate the handle part 4 in order to open the vehicle door 2*a* or vehicle tailgate 2*b*. According to the present invention, the handle part 4 is transferred from the non-use position into the actuating position in a current-operated normal operation by means of an actuating element 6 (see for example FIG. 5). Proximity sensors or other sensors can be provided for the current-operated normal operation in order to bring the handle part 4 from the flush or area-flush rest position into the ready position as soon as an operator approaches the motor vehicle handle arrangement 3 or the handle part 4. For this purpose, proximity sensors known from the prior art may be installed in the handle part 4, which sensors send a signal to a vehicle control device upon detection of an authorized operator or ID transmitter, whereby the actuating element 6 is put into operation and causes the extension of the handle part 4 into the actuating position.

Figure 4:
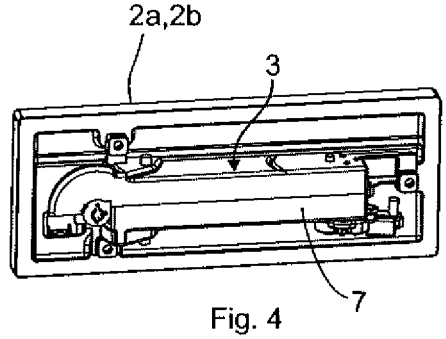
FIG. 4 shows a perspective rear view of the motor vehicle handle arrangement.
Figure 5:
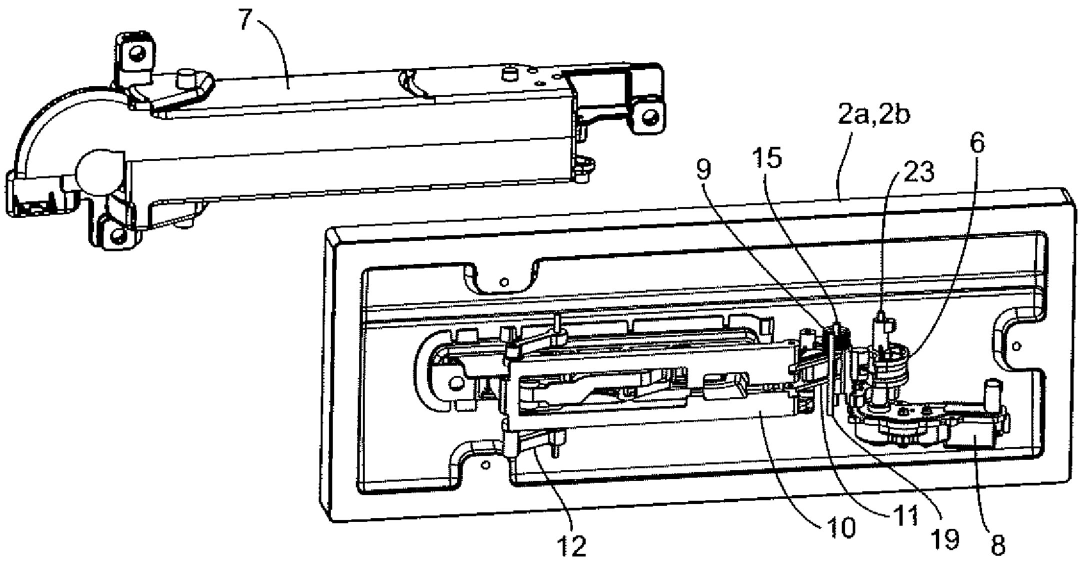
FIG. 5 shows a further perspective rear view of the motor vehicle handle arrangement, wherein a support element of the motor vehicle handle arrangement is shown separately.

The motor vehicle handle arrangement 3 according to the invention is described in more detail below with reference to FIGS. 4 to 17. FIGS. 4 and 5 show the motor vehicle handle arrangement 3 in a perspective rear view, the motor vehicle handle arrangement 3 having a support element 7 which, in the exemplary embodiment shown, is fastened on the inside to the motor vehicle door 2*a* and is constructed in two parts, wherein a one-part or more than two part-design is conceivable. In FIG. 5, the support element 7 is removed from the motor vehicle door 2*a* or the vehicle tailgate 2*b* in order to obtain a view of the other components of the motor vehicle handle arrangement 3, from which it can be seen that the support element 7 serves to mount the other components of the motor vehicle handle arrangement 3. In addition, the support element 7 is designed in the manner of a housing and shields the other components of the motor vehicle handle arrangement 3 in a protective manner. The other components of the motor vehicle handle arrangement 3 according to the invention include, among other things, the motor-driven actuating element 6, which is movably mounted on the support element 7 by a drive element 8 (see FIG. 5) between a neutral position and an active position, a handle part 4 shown in FIGS. 4 and 5, which is movably mounted on the support element 7 between the non-use position and the actuating position serving for actuation by a user, and a mechanical restoring element 9 which in the normal operation of the motor vehicle handle arrangement 3 presses the handle part 4 back from its actuating position into its non-use position, when the motor-driven actuating element 6 moves back into its neutral position. Furthermore, in the exemplary embodiment shown, a base plate 10 is provided, on which the handle part 4 is rigidly attached. The base plate 10 is movably mounted on the support element 7 via a lever element 11 and a movement lever 12, only the lever element 11 being moved by the actuating element 6, which is driven by the drive element 8. While the lever element 11 is rotatably connected to a first longitudinal end of the base plate 10, the movement lever 12 is rotatably connected to a second longitudinal end of the base plate 10, wherein from each of the lever element 11 and the movement lever 12 at least one arm can be guided by a guide link formed in the support element 7. The lever element 11 and the movement lever 12 are motion-coupled to one another via the base plate 10 and a coupling rod 14, so that a movement of the lever element 11 caused by the actuating element 6 simultaneously moves the movement lever 12. The movement of the lever element 11 is a rotary movement about an axis of rotation 15. The base plate 10, the lever element 11, and the movement lever 12 can be better seen in the perspective illustration in FIG. 6, in which, for reasons of better clarity, the vehicle door 2*a*, the support element 7 and the drive element 8 are omitted in comparison with FIGS. 4 and 5. The coupling rod 14, however, can be seen in a bottom view from behind the motor vehicle handle arrangement 3, as shown in FIG. 7. As an alternative to the exemplary embodiment shown, it is conceivable that only a single lever is mounted on the support element 7 and is rotatably connected to the base plate 10; in a further alternative the handle part 4 can also be stored without a base plate directly via at least one lever on the support element 7.

Figure 6:
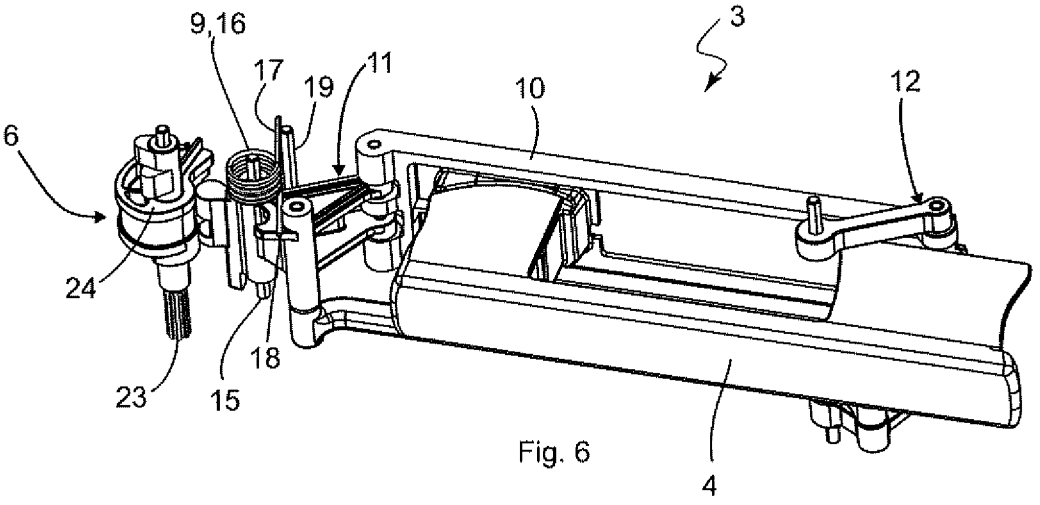
FIG. 6 shows a perspective front view of the motor vehicle handle arrangement without the support element.
Figure 7:
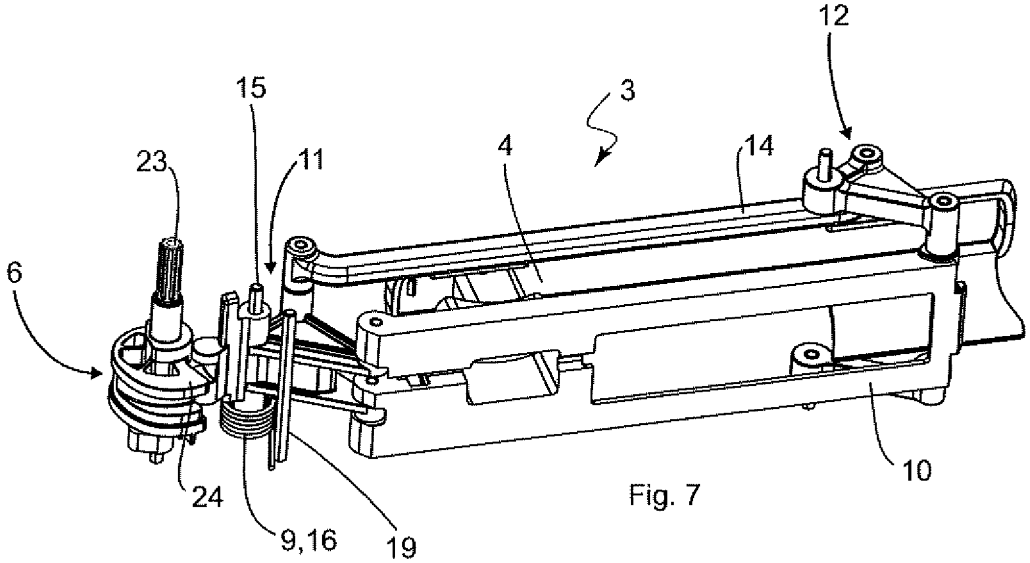
FIG. 7 shows a bottom view of the motor vehicle handle arrangement shown in FIG. 6.
Figure 8:
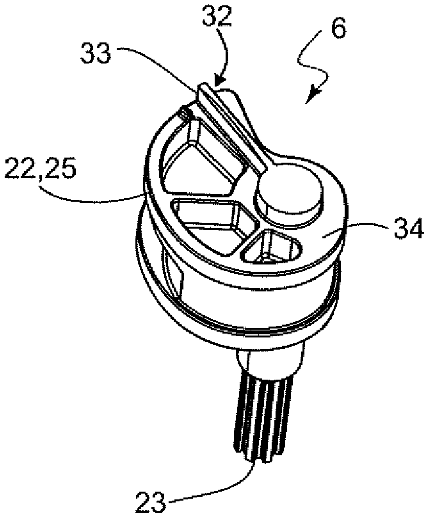
FIG. 8 shows a perspective view of an actuating element of the motor vehicle handle arrangement according to the invention.
Figure 9:
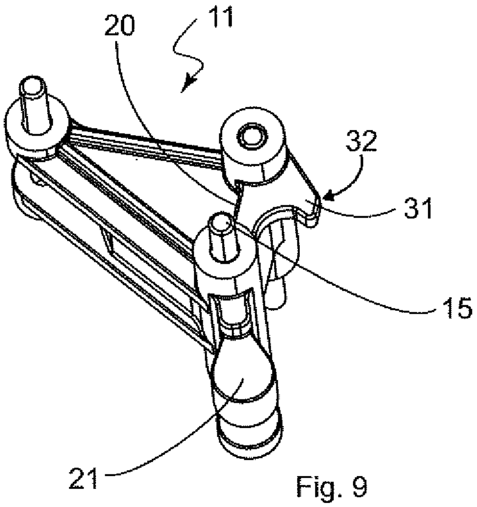
FIG. 9 shows a perspective view of a lever element of the motor vehicle handle arrangement according to the invention.

As can further be seen from FIGS. 6 and 7, the mechanical restoring element 9 is designed as a spring element 16 having a first spring leg 17 and a second spring leg 18. The spring element 16 is arranged on the axis of rotation 15 and wound around it. The first spring leg 17 is supported on a support projection 19 formed on the support element 7, whereas the second spring leg 18 is supported on a restoring arm 20 of the lever element 11 (see, for example, FIG. 9). Furthermore, the lever element 11 has an actuating arm 21 (see also, for example, FIG. 9) which, during normal operation of the motor vehicle handle arrangement 3, bears against a movement contour 22 formed on the motor-driven actuating element 6 (see, for example, FIG. 8). The motor-driven actuating element 6 is mounted on the support element 7 via a motor drive axis 23 and is designed as an eccentric disc 24, the edge 25 of which forms the movement contour 22. With respect to the motor drive axis 23, the edge 25 has a portion having a non-constant and increasing radius 26, which is arranged lying between a first edge portion 27 with a first radius 28 and a second edge portion 29 with a second radius 30, wherein the first radius 28 is smaller than the second radius 30, the first radius 28 and the second radius 30 are constant, and the increasing radius 26 continuously merges into the first radius 28 and the second radius 30 (see FIGS. 14 and 16). In addition, a hook-shaped driver projection 31 is formed on the actuating arm 21 of the lever element 11. For an auxiliary operation of the motor vehicle handle arrangement 3, if the handle part 4 is frozen in its actuating position, the invention provides an auxiliary restoring element 32, which has a driver web 33 which interacts with the driver projection 31 in the auxiliary operation. In the exemplary embodiment shown in the figures, the driver web 33 of the auxiliary restoring element 32 is formed on a side surface 34 of the eccentric disc 24 and extends in the radial and axial directions, as can be seen, for example, from FIG. 8. The auxiliary restoring element 32 or the driver web 33 and the edge 25 or the movement contour 22 are arranged at a different axial position with respect to the motor drive axis 23.

The mode of operation of the motor vehicle handle arrangement 3 according to the invention and of the auxiliary restoring element 32 is described below with reference to FIGS. 10 to 17.

Figure 10:
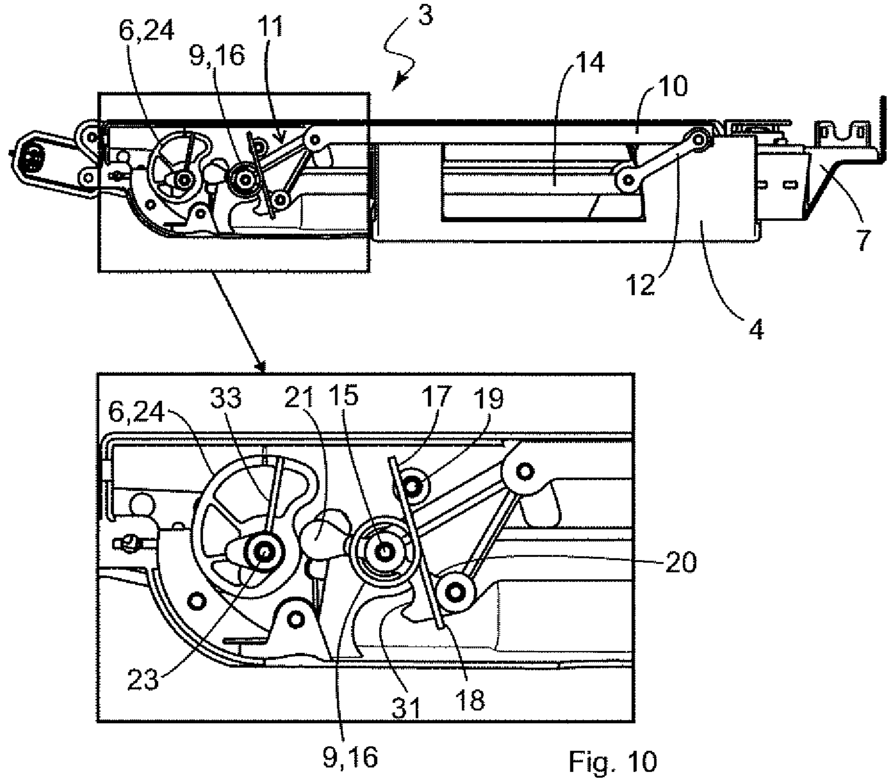
FIG. 10 shows a plan view of the motor vehicle handle arrangement and an enlarged detailed view for the lever element in normal operation, wherein the handle part is arranged in its non-use position and the actuating element is arranged in its neutral position.

FIG. 10 shows an operating state in which the handle part 4 is arranged to run flush or area-flush with the outside 5 of the vehicle door 2*a* or the vehicle tailgate 2*b* in its non-actuated position. The actuating element 6 is in its neutral position, wherein the actuating arm 21 abuts the end of the first edge portion 27 of the movement contour 22 of the actuating element 6.

Figure 11:
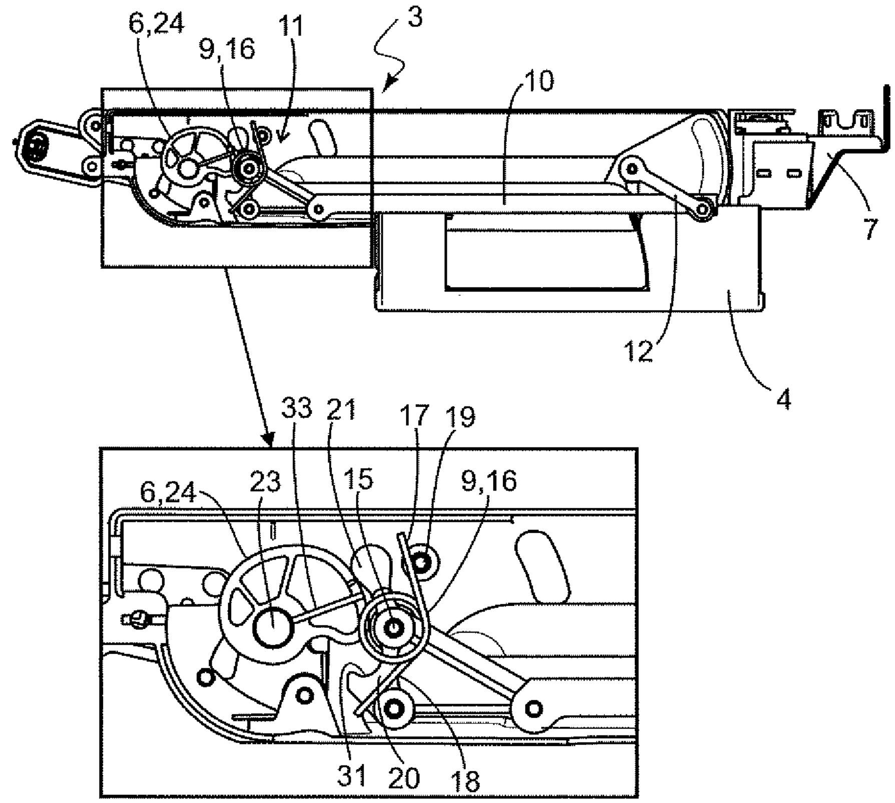
FIG. 11 shows a plan view of the motor vehicle handle arrangement and an enlarged detailed view for the lever element in normal operation, the handle part being arranged in its actuating position and the actuating element in its active position.

FIG. 11 shows an operating state in which the handle part 4 is arranged in its actuating position and the actuating element 6 in its active position. Shown in FIG. 11 is a normal operation of the motor vehicle handle arrangement 3, in which the motor-driven actuating element 6, which is driven by the drive element 8 when moving from the neutral position into the active position, moves the handle part 4 from the non-use position into the actuating position, that is to say from the position shown in FIG. 10. Here, the actuating arm 21 of the lever element 11 slides first along the first edge portion 27 and then along the portion with the increasing radius 26, as a result of which the actuating element 6 rotates the lever element 11 clockwise about the axis of rotation 15, wherein the actuating element 6 rotates counterclockwise around the motor drive shaft 23. After the actuating arm 21 has moved along the portion with the increasing radius 26, the actuating arm 21 moves along the second edge portion 29 of the actuating element and reaches its actuating position, as shown in FIG. 11. With regard to the portions with the different radii, reference is made to FIGS. 14 and 16. When it is arranged in the active position, the motor-driven actuating element 6 holds the handle part 4 in the actuating position. When the actuating element 6 moves from the neutral position into the active position, the first spring leg 17 and the second spring leg 18 are moved towards one another, as a result of which the spring element 16 is compressed and exerts a spring force on the restoring arm 20 in order to move the lever element 11 about the axis of rotation 15 and to thus arrange the handle part 4 again into its non-actuated position. This is prevented by the movement contour 22 of the actuating element 6, against which the actuating arm 21 of the lever element 11 rests. Consequently, in the normal operation of the motor vehicle handle arrangement 3, the mechanical restoring element 9 pushes the handle part 4 back out of its actuating position into its non-use position when the motor-driven actuating element 6 moves back into its neutral position, but this is prevented by the actuating element 6 arranged in its active position in FIG. 11.

Figure 12:
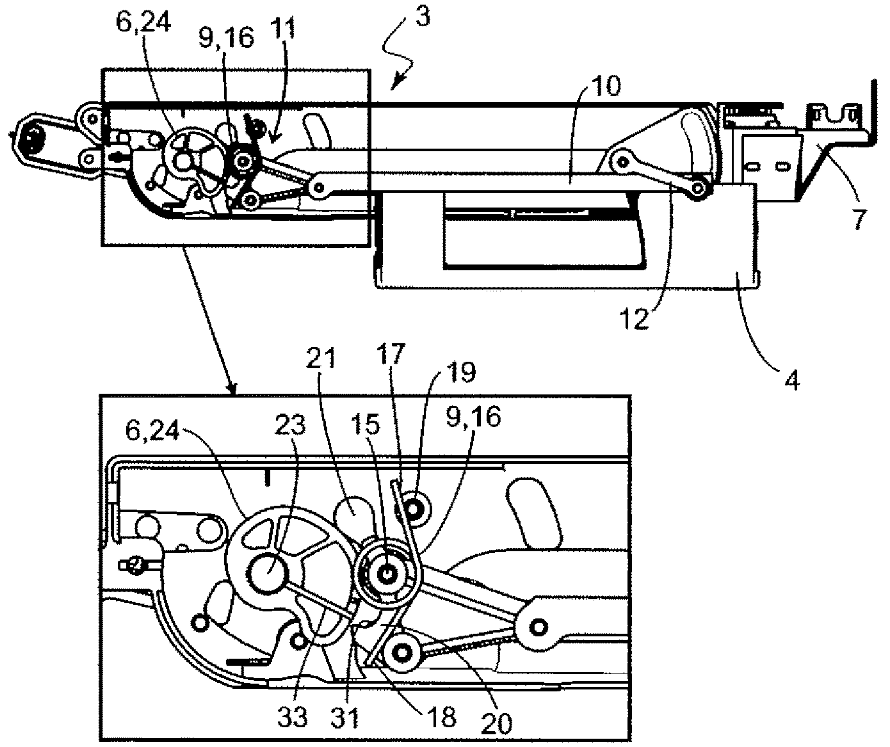
FIG. 12 shows a plan view of the motor vehicle handle arrangement and an enlarged detail view for the lever element in normal operation, wherein the actuating element is on its return from the active position to the neutral position.
Figure 14:
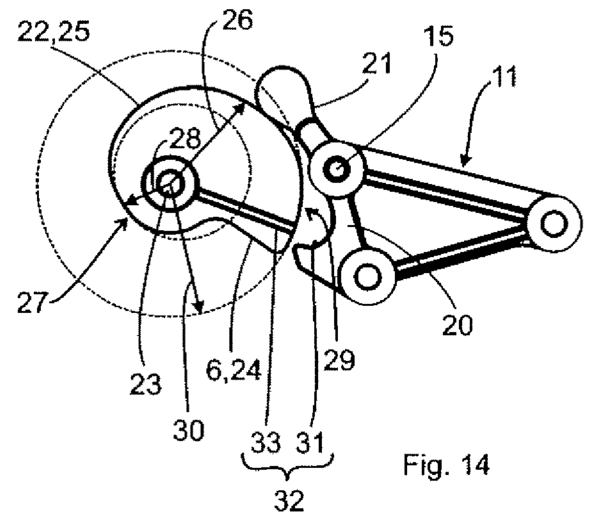
FIG. 14 shows a plan view of the actuating element and the lever element in normal operation when the actuating element moves back from the active position into the neutral position.
Figure 15:
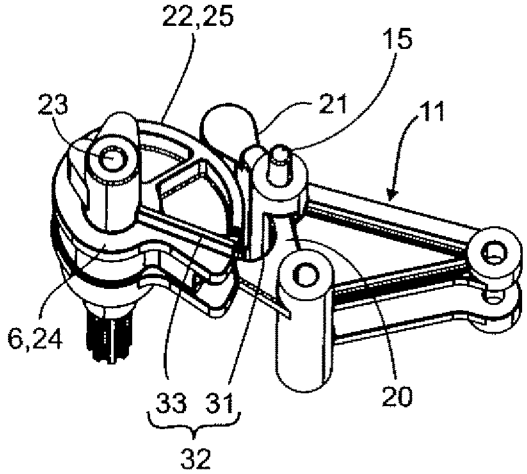
FIG. 15 shows a perspective view of FIG. 14.

So that the handle part 4 returns from its actuating position to its non-actuating position, the actuating element 6 is put into operation and moved from its active position back into the neutral position. A snapshot of this movement in its starting phase is shown in FIG. 12 for normal operation of the motor vehicle handle arrangement 3. In normal operation, the actuating arm 21 slides along the increasing radius 26 (which is now a decreasing radius in this direction of movement) of the movement contour 22 of the actuating element 6, since the mechanical restoring element 9, which is designed as a spring element 16, presses against the restoring arm 20 with its spring force. The lever arm 11 is rotated counterclockwise about the axis of rotation 15, wherein the actuating element 6 rotates clockwise about the motor drive axis 23. In this way, the handle part 4 returns to the non-actuating position shown in FIG. 11. Consequently, in normal operation, the actuating arm 21 of the lever element 11 is permanently and fixedly abutting against the movement contour 22 of the motor-driven actuating element 6, wherein in normal operation the driver projection 31 on the restoring arm 20 and the driver web 33 of the auxiliary restoring element 32, which is formed in the exemplary embodiment on the actuating element 6, move past one another at a distance and do not come into engagement. This situation is also shown again in FIGS. 14 and 15, FIG. 15 showing a perspective view of FIG. 14. The driver projection 31 of the restoring arm 20 thus moves in the normal operation of the motor vehicle handle arrangement 3 during the movement of the actuating element 6 from the active position into the neutral position from a region defined by the second radius 30 of the second edge portion 29 of the movement contour 22 of the actuating element 6 and thus from a movement path of the driver web 33.

Figure 13:
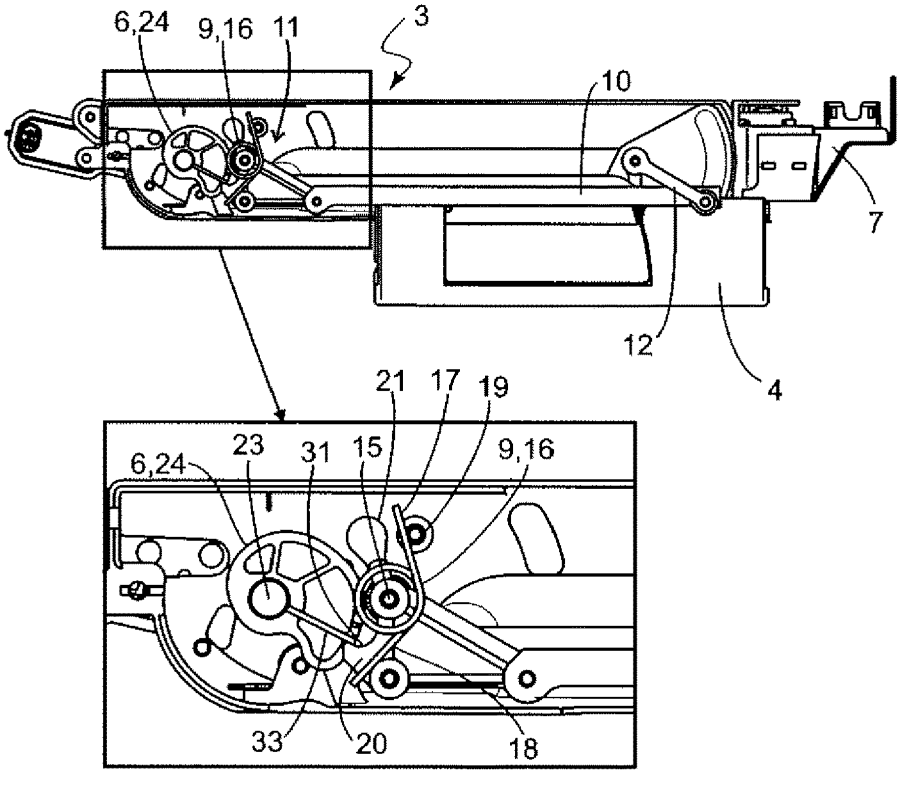
FIG. 13 shows a plan view of the motor vehicle handle arrangement and an enlarged detailed view for the lever element during a faulty operation, wherein the actuating element is on its return from the active position to the neutral position and an auxiliary restoring element engages with the lever element.
Figure 16:
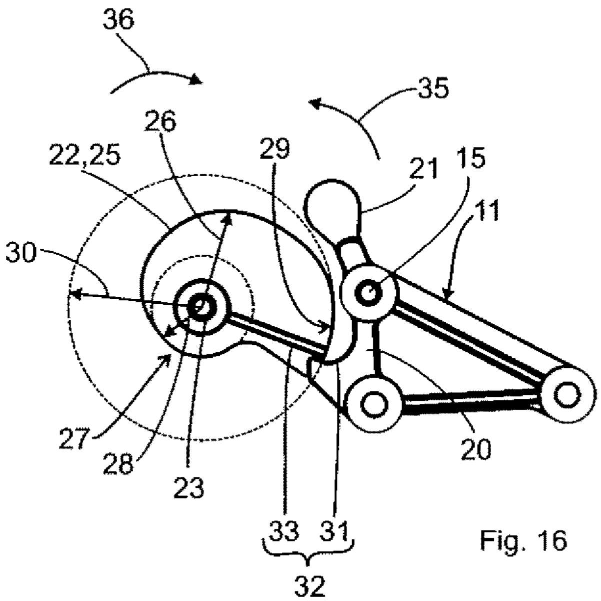
FIG. 16 is a plan view of the actuating element and the lever element during the faulty operation when the actuating element returns from the active position to the neutral position and FIG. 17 shows a perspective view of FIG. 16.
Figure 17:
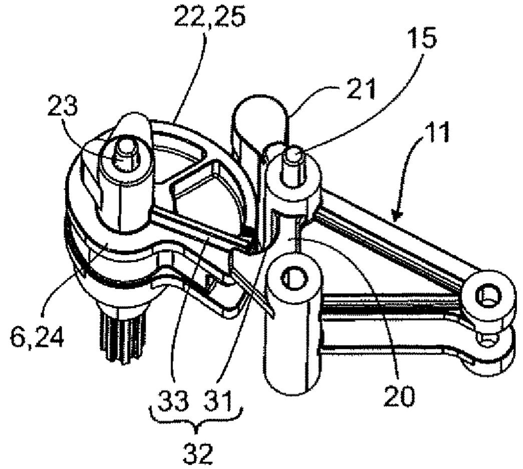

During a faulty operation, the handle part 4 is frozen in its actuating position or is otherwise slightly blocked, so that although the actuating element 6 moves from the active position in the direction of its neutral position, the actuating arm 21 of the lever element 11 does not rest on the movement contour 22 of the actuating element 6, since the spring force of the restoring element 9 is not sufficient to force the handle part 4 out of the actuating position. In order to "break free" the handle part 4 from the actuating position when the handle part 4 is arranged blocked in its actuating position, for example due to ice formation, the auxiliary restoring element 32 is provided, which consists of the driver projection 31 formed on the restoring arm 20 and the driver web 33 formed on the actuating element 6, Such a situation is shown in FIG. 13, in which the actuating element 6 has already moved from its active position in the direction of its neutral position and has rotated clockwise around the motor drive axis 23, whereas the handle part 4 is still arranged in its actuating position and the actuating arm 21 is arranged at a distance from the movement contour 22 of the actuating element 6. FIGS. 16 and 17 also show this situation, wherein only the actuating element 6 and the lever element 11 are shown for reasons of clarity. According to the invention, the auxiliary restoring element 32 moves the handle part 4 in the direction of its non-use position, at least for a portion of its movement, during the faulty operation of the motor vehicle handle arrangement 3, in which the motor-driven actuating element 6 moves into the neutral position and the handle part 4 is still arranged in its actuating position. The handle part 4 is also moved by the auxiliary restoring element 32 for a rotary movement of the actuating element 6 about the motor drive axis 23 for an angular range of at least 2° to a maximum of 10°, preferably of 5°. For this purpose, when the motor-driven actuating element 6 moves from the active position into the neutral position, the driver web 33 engages with the driver projection 31 and rotates the lever element 11 in a restoring direction of rotation 35 (see, for example, FIG. 16), which is directed counterclockwise the axis of rotation 15. In the faulty operation of the motor vehicle handle arrangement 3, the driver projection 31 is temporarily in engagement with the driver projection 31 for a predetermined angular range, which is defined by the rotary movement of the actuating element 6 about the motor drive axis 23. In the auxiliary operation, the movement of the motor-driven actuating element 6 from the active position into the neutral position is a rotary movement about the motor drive axis 23 in a direction of rotation 36 opposite to the restoring direction of rotation 35, as is shown, for example, in FIG. 16. It is characteristic of the invention during the faulty operation of the motor vehicle handle arrangement 3 that when the actuating element 6 moves from the active position in the direction of the neutral position, the driver projection 31 of the restoring arm 20 is arranged within a range that is defined from the second radius 30 of the second edge portion 29 movement contour 22 of the actuating element 6. In this way, the driver projection 31 of the restoring arm 20 temporarily engages with the driver web 33 of the actuating element 6, as a result of which the lever element 11 and thus the handle part 4 experience a jerky movement, which, for example, break free a frozen handle part 4, which causes the restoring element 9 to exert its spring force on the restoring arm 20 so that the actuating arm 21 again comes into contact with the movement contour 22 of the actuating element 6 and the restoring arm 20 reaches the outside of the movement path of the driver web 33 and thus outside the area formed by the second radius 30.

In the present exemplary embodiment, the driver web 33 is arranged on the actuating element 6. However, the invention relates not only to such a configuration as described above and shown in the figures. Alternatively, the driver web 33 or another element of the auxiliary restoring element 32 can also be formed and arranged separately from the actuating element 6. For example, the driver web 33 could also be formed on a separate and rotatable or linearly movable auxiliary component of the motor vehicle handle arrangement 3, wherein the auxiliary component is motion-coupled to the motor-driven actuating element 6, i.e. either the auxiliary component can be mechanically coupled to the movement of the actuating element 6, so that this auxiliary component is also moved during a movement of the actuating element 6 from its active position in the direction of its neutral position, or the auxiliary component can be driven by a separate drive, wherein the drive is operated as a function of the movement of the actuating element 6 when that actuating element 6 moves from the active position in the direction of its neutral position, for which purpose, for example, a vehicle control device can be set up which, when the actuating element 6 is started up, simultaneously operates the additional drive for the auxiliary component with the driver web 33. The present invention understands both possibilities under the expression "motion-coupled."

According to the inventive method for operating the motor vehicle handle arrangement 3 described above, the motor-driven actuating element 6 is moved from the neutral position into the active position in a normal operation of the motor vehicle handle arrangement 3, wherein the handle part 4 is thereby moved from the non-use position into the actuating position by the motor-driven actuating element 6. The handle part 4 is then held in the actuating position by the actuating element 6 arranged in its active position. In normal operation, the handle part 4 is pushed back by the mechanical restoring element 9 from its actuating position into its non-use position when the motor-driven actuating element 6 moves back into its neutral position. On the other hand, during the faulty operation in which the motor-driven actuating element 6 is moved into the neutral position and the handle part 4 remains in its actuating position, the auxiliary restoring element 32 moves the handle part 4 in the direction of its non-use position at least for a portion of its movement. The movement of the lever element 11 by means of the auxiliary restoring element 32 can be 2° to 10°, preferably 5°.

Of course, the invention described above is not limited to the described and illustrated embodiment. It can be seen that numerous modifications can be made to the embodiment depicted in the drawing, which are obvious to the person skilled in the art according to the intended application, without leaving the scope of the invention. The invention includes everything that is contained in the description and/or depicted in the drawing, including anything that, deviating from the concrete exemplary embodiment, is obvious to the person skilled in the art.

The invention claimed is:

1. A motor vehicle handle arrangement comprising a support element which can be fastened to a vehicle door or a vehicle tailgate, a motor-driven actuating element which is movably mounted on the support element between a neutral position and an active position, a handle part, which is movably mounted on the support element between a non-use position and an actuating position serving for actuation by a user, and a mechanical restoring element, wherein the motor-driven actuating element is designed to move the handle part from the non-use position into the actuating position during its movement from the neutral position into the active position in the normal operation of the motor vehicle handle arrangement and to hold the handle part in the actuating position when arranged in the active position, and wherein the mechanical restoring element in the normal operation of the motor vehicle handle arrangement presses the handle part back from its actuating position into its non-use position when the motor-driven actuating element moves back into its neutral position, wherein an auxiliary restoring element is movably mounted on the support element and is motion-coupled to the motor-driven actuating element, wherein the auxiliary restoring element is designed to move the handle part at least for a portion of its movement in the direction of its non-use position during a faulty operation of the motor vehicle handle arrangement, in which the motor-driven actuating element moves into the neutral position and the handle part remains in its actuating position, and wherein at least one lever element is rotatably mounted about an axis of rotation on the support element, by means of which the handle part is movably mounted on the support element.

2. The motor handle arrangement according to claim 1, wherein the handle part when installed in the vehicle door or vehicle tailgate is arranged to run flush in relation to the outside of the vehicle door or vehicle tailgate in the non-use position and is arranged to be extended in the actuating position in relation to the outside of the vehicle door or vehicle tailgate for actuation by a user in the actuating position.

3. The motor vehicle handle arrangement according to claim 1, wherein the mechanical restoring element is designed as a spring element having a first spring leg and a second spring leg, wherein the first spring leg is supported on a support projection formed on the support element and the second spring leg is supported on a restoring arm of the lever element.

4. The motor vehicle handle arrangement according to claim 3, wherein a driver projection is formed on the restoring arm and the auxiliary restoring element has a driver web which is designed to intermittently engage with the driver projection and to rotate the lever element in a restoring direction of rotation about the axis of rotation during a faulty operation, when the motor-driven actuating element moves from the active position into the neutral position.

5. The motor vehicle handle arrangement according to claim 4, wherein the motor-driven actuating element is mounted on the support element via a motor drive axis, wherein the movement of the motor-driven actuating element from the active position to the neutral position in the auxiliary operation is a rotary movement about the motor drive axis in a direction of rotation opposite to the restoring direction of rotation.

6. The motor vehicle handle arrangement according to claim 5, wherein the motor-driven actuating element is designed as an eccentric disc, the edge of which forms the movement contour, wherein the edge has an increasing radius with respect to the motor drive axis along which radius the actuating arm of the lever element slides when the motor-driven actuating element moves from the neutral position into the active position.

7. The motor vehicle handle arrangement according to claim 6, wherein the driver web of the auxiliary restoring element is formed on a side surface of the eccentric disc.

8. The motor vehicle handle arrangement according to claim 1, wherein the lever element has an actuating arm which, in normal operation, bears against a movement contour formed on the motor-driven actuating element.

9. The motor vehicle handle arrangement according to claim 1, wherein the at least one lever element which is rotatably mounted on the support element is rotatably connected to a base plate to which the handle part is attached.

* * * * *